(12) United States Patent
Miwa et al.

(10) Patent No.: US 10,208,798 B2
(45) Date of Patent: *Feb. 19, 2019

(54) ROLLING DEVICE

(71) Applicant: NTN CORPORATION, Osaka (JP)

(72) Inventors: Noriaki Miwa, Mie (JP); Yukio Matsubara, Mie (JP)

(73) Assignee: NTN CORPORATION, Osaka (JP)

(*) Notice: Subject to any disclaimer, the term of this patent is extended or adjusted under 35 U.S.C. 154(b) by 373 days.

This patent is subject to a terminal disclaimer.

(21) Appl. No.: 14/917,008

(22) PCT Filed: Sep. 5, 2014

(86) PCT No.: PCT/JP2014/073481
§ 371 (c)(1),
(2) Date: Mar. 5, 2016

(87) PCT Pub. No.: WO2015/034044
PCT Pub. Date: Mar. 12, 2015

(65) Prior Publication Data
US 2016/0208854 A1    Jul. 21, 2016

(30) Foreign Application Priority Data

Sep. 5, 2013   (JP) .................................. 2013-184250
Sep. 25, 2013  (JP) .................................. 2013-197729
(Continued)

(51) Int. Cl.
*F16C 33/62* (2006.01)
*C22C 38/02* (2006.01)
(Continued)

(52) U.S. Cl.
CPC .......... *F16C 33/62* (2013.01); *B60B 27/0094* (2013.01); *C21D 1/06* (2013.01);
(Continued)

(58) Field of Classification Search
CPC ...... F16C 33/62; F16C 2300/02; F16C 33/34; F16C 33/32; C22C 38/02; C22C 38/04;
(Continued)

(56) References Cited

U.S. PATENT DOCUMENTS

2003/0040442 A1    2/2003  Yokouchi

FOREIGN PATENT DOCUMENTS

JP    48-12288 A    6/1969
JP    57-039126 A   3/1982
(Continued)

OTHER PUBLICATIONS

Ruffer, Nicholas J., "The influence of sulfur on the rolling contact fatigue life of SAE E52100 bearing quality steel," Microstructural Science (1992) 19, 325-339. (Year: 1992).*

(Continued)

*Primary Examiner* — Anthony J Zimmer
(74) *Attorney, Agent, or Firm* — Hedman & Costigan, P.C.; James V. Costigan; Kathleen A. Costigan

(57) ABSTRACT

Provided is a rolling device in which hydrogen is not easily accumulated within a roller element made of steel, such as an inner race and an outer race, and premature separation due to hydrogen embrittlement is prevented from occurring. A rolling bearing 1 having an inner race 2, an outer race 3, and rolling bodies 4, and at least one selected from the inner race 2, the outer race 3, and the rolling bodies 4 is made of predetermined steel. At least a part of oxide-based inclusions included in the steel is covered by MnS, and a ratio of a number of oxide-based inclusions covered by MnS is over 40% of a total number of oxide-based inclusions having maximum diameter of 3 μm or greater in the steel.

11 Claims, 15 Drawing Sheets

(30) Foreign Application Priority Data

| Sep. 25, 2013 | (JP) | ................................ | 2013-197730 |
| Sep. 25, 2013 | (JP) | ................................ | 2013-197731 |
| Sep. 25, 2013 | (JP) | ................................ | 2013-197732 |

(51) Int. Cl.

| *C22C 38/04* | (2006.01) |
| *C22C 38/44* | (2006.01) |
| *B60B 27/00* | (2006.01) |
| *F16C 33/34* | (2006.01) |
| *C23C 8/26* | (2006.01) |
| *C21D 9/40* | (2006.01) |
| *C22C 38/40* | (2006.01) |
| *C22C 38/50* | (2006.01) |
| *C21D 9/32* | (2006.01) |
| *C22C 38/00* | (2006.01) |
| *C21D 1/06* | (2006.01) |
| *C22C 38/18* | (2006.01) |
| *F16C 33/32* | (2006.01) |
| *C21D 1/25* | (2006.01) |

(52) U.S. Cl.
CPC .................. *C21D 9/32* (2013.01); *C21D 9/40* (2013.01); *C22C 38/00* (2013.01); *C22C 38/002* (2013.01); *C22C 38/02* (2013.01); *C22C 38/04* (2013.01); *C22C 38/18* (2013.01); *C22C 38/44* (2013.01); *C22C 38/50* (2013.01); *C23C 8/26* (2013.01); *F16C 33/32* (2013.01); *F16C 33/34* (2013.01); *C21D 1/25* (2013.01); *C21D 2211/004* (2013.01); *F16C 2300/02* (2013.01)

(58) Field of Classification Search
CPC ....... C22C 38/44; C22C 38/002; C22C 38/50; C22C 38/00; C22C 38/18; B60B 27/0094; C23C 8/26; C21D 9/40; C21D 1/06; C21D 2211/004; C21D 1/25; C21D 9/32
See application file for complete search history.

(56) References Cited

FOREIGN PATENT DOCUMENTS

| JP | 61-58549 B2 | 12/1986 |
| JP | 01-168848 A | 7/1989 |
| JP | 03-210394 A | 9/1991 |
| JP | 2000-282178 A | 10/2000 |
| JP | 2000-304121 A | 11/2000 |
| JP | 2002-146473 A | 5/2002 |
| JP | 2005-036880 A | 2/2005 |
| JP | 2005-042102 A | 2/2005 |
| JP | 2005-076679 A | 3/2005 |
| JP | 2005-187888 A | 7/2005 |
| JP | 2006-046401 A | 2/2006 |
| JP | 2006-063402 A | 3/2006 |
| JP | 2006-071104 A | 3/2006 |
| JP | 2007-009997 A | 1/2007 |
| JP | 2007-331010 A | 12/2007 |
| JP | 2008-121035 A | 5/2008 |
| JP | 2009-024218 A | 2/2009 |
| JP | 2009-030145 A | 2/2009 |
| JP | 2009-108354 A | 5/2009 |
| JP | 2009-235447 A | 10/2009 |
| JP | 2009235447 A * | 10/2009 |
| JP | 2009-275275 A | 11/2009 |
| JP | 2010-047832 A | 3/2010 |
| JP | 2012-002349 A | 1/2012 |
| JP | 2013-001930 A | 1/2013 |
| JP | 2013-001931 A | 1/2013 |
| JP | 2013-001940 A | 1/2013 |
| JP | 2013-112861 A | 6/2013 |
| JP | 2013-119930 A | 6/2013 |
| WO | 2011/024792 A1 | 3/2011 |
| WO | 2013/085033 A1 | 6/2013 |

OTHER PUBLICATIONS

Rosseau, M. D., Service properties of ball bearing steels, Stahlberatung (1979), 6(4), 22-24. (Year: 1979).*
Rosseau et al., "Nonmetallic inclusion rating and fatigue properties of ball bearing steels," ASTM Special Technical Publication (1975), 575, 49-65. (Year: 1975).*
International Search Report for PCT/JP2014/073481 dated Nov. 11, 2014.
L. Grunberg, The Formation of Hydrogen Peroxide on Fresh Metal Surfaces, Proc. Phys. Soc., 1953, 153-161, B66, London.
L. Grunberg and D. Scott, The Acceleration of Pitting Failure by Water in the Lubricant, Journal of the Institute of Petroleum, 1958, 406-410, 44-419.
L. Grunberg, D. T. Jamieson and D. Scott, Hydrogen Penetration in Water-Accelerated Fatigue of Rolling Surfaces, Philosophical magazine, 1963, 1553-1568, 8.
P. Schatzberg and I. M. Felsen, Effects of Water and Oxygen During Rolling Contact Lubrication, Wear, 1968, 331-342, 12.
P. Schatzberg, Inhibition of Water-Accelerated Rolling-Contact Fatigue, Journal of Lubrication Technology, 1971, 231-235.
K. Tamada and H. Tanaka, Occurrence of Brittle Flaking on Bearings Used for Automotive Electrical Instruments and Auxiliary Devices, Wear, 1996, 245-252, 199.
H. Mikami and T. Kawamura, Influence of Electrical Current on Bearing Flaking Life, SAE Technical Paper Series, 2007, No. 2007-01-0113.
Y. Matsubara and H. Hamada, A Novel Method to Evaluate the Influence of Hydrogen on Fatigue Properties of High Strength Steels, Journal of ASTM International, 2006, 153-166, 3-2.
D. Brooksbank and K. W. Andrews, Thermal Expansion of Some Inclusions Found in Steels and Relation to Tessellated Stresses, Journal of the Iron and Steel Institute, Jun. 1968, 595-599.
D. Brooksbank and K. W. Andrews, Tessellated Stresses Associated with Some Inclusions in Steel, Journal of the Iron and Steel Institute, Apr. 1969, 474-483.
Akihide Nagao, Shigeru Kuramoto, Motohiro Kanno and Tetsuo Shiraga, Visualization of Hydrogen Diffusion Promoted by Stress Gradient and Plastic Deformation in Steels, Iron and Steel, 2000, 24-31, 86.
Kenichi Takai, Junichi Seki, Goro Yamauchi and Yoshikazu Homma, Observation of Trapping Sites of Hydrogen and Deuterium in High-Strength Steels with Secondary Ion Mass Spectrometry, J. Japan Inst. Metals, 1994, 1380-1385, 58-12.
Kenichi Takai, Yoshikazu Homma, Kaori Tsutsui and Michihiko Nagumo, Identification of Trapping Sites in High-Strength Steels by Secondary Ion Mass Spectrometry for Thermally Desorbed Hydrogen, J. Japan Inst. Metals, 1996, 1155-1162, 60-12.
Toshimitsu Yokobori, Takenao Nemoto, Koji Sato and Tetsuya Yamada, Numerical Analysis on Hydrogen Diffusion in Solid Around the Crack Tip, Transactions of the JSME A, 1993, 2120-2127, 59.
English Abstract of JP 2000-282178 A.
English Abstract of JP 03-210394 A.
English Abstract of JP 2005-042102 A.
English Abstract of JP 2013-001931 A.
English Abstract of JP 2013-001930 A.
English Abstract of JP 2010-047832 A.
English Abstract of JP 2009-108354 A.
English Abstract of JP 2009-024218 A.
English Abstract of JP 2008-121035 A.
English Abstract of JP 2006-063402 A.
English Abstract of JP 2005-187888 A.
English Abstract of JP 2013-119930 A.
English Abstract of JP 2009-235447 A.
English Abstract of JP 2005-036880 A.
English Abstract of JP 2000-304121 A.
English Abstract of JP 2007-009997 A.
Supplementary European Search Report dated Apr. 13, 2017.

(56) References Cited

OTHER PUBLICATIONS

English Abstract for JP 2002-146473 A dated May 22, 2002.
English Claims for JP 61-58549 B2 dated Dec. 12, 1986.
English Abstract for JP 01-168848 A dated Jul. 4, 1989.
English Abstract for JP 2005-076679 A dated Mar. 24, 2005.
English Abstract for JP 2006-046401 A dated Feb. 16, 2006.
English Abstract for JP 2009-275275 A dated Nov. 26, 2009.
English Abstract for JP 57-039126 A dated Mar. 4, 1982.
English Abstract for JP 2007-331010 A dated Dec. 27, 2007.
English Abstract for JP 2013-112861 A dated Jun. 10, 2013.
English Claims for JP 48-12288 A dated Jun. 21, 1969.

* cited by examiner

COMPARATIVE EXAMPLE 1 (CONVENTIONAL STEEL)

EXAMPLE 1 (DEVELOPED STEEL)

EXAMPLE 2 (DEVELOPED STEEL)

EXAMPLE 3 (DEVELOPED STEEL)

ROLLING DEVICE

TECHNICAL FIELD

The present invention relates to a rolling device having a roller element using specific steel. Examples of such a rolling device include: a rolling bearing used in automotive electric components and auxiliary components such as alternator, electromagnetic clutches for an car air-conditioner, fan coupling devices, intermediate pulleys, and electric fan motors; a rolling bearing used in step-up gears or reduction gears for a wind generator or the like; a rolling bearing used for transmissions such as a continuously variable transmission; a hub bearing for rotatably supporting a wheel of an automobile; and a gear.

BACKGROUND ART

Among various types of the rolling devices, when a rolling bearing is used under such a condition in which water mixes into a lubricating agent or the like (Non Patent Documents 1-5), in which slipping is involved (Non Patent Document 6), and in which power distribution occurs (Non Patent Document 7), premature separation may often be caused due to hydrogen embrittlement by decomposition of water or the lubricating agent to produce hydrogen, and entering of the produced hydrogen into steel. As hydrogen significantly reduces a fatigue strength of steel (Non Patent Document 8), even under a condition of elastohydrodynamic lubrication in which contact elements are separated by an oil film, cracks may be produced within and near a rolling surface where an alternating shear stress is maximized and propagated, resulting in premature separation. In order to respond to demands for downsizing, energy saving, and elimination of manpower in the future, use conditions of a rolling bearing tend to become increasingly severe, and it is expected that a higher resistance to hydrogen embrittlement is required. In a case of the rolling device such as a gear having greater slipping than a rolling bearing, an occurrence of similar premature separation is quite expected.

In recent years, with increasing demands for downsizing, weight saving, and an improvement of quietness, efforts for downsizing, weight saving, and an improvement of sealing properties within an engine compartment for electric components and auxiliary components of automobiles are also demanded. On the other hand, higher output and higher efficiency are more and more demanded as capabilities of the device itself. For electric components and auxiliary components within an engine compartment, a method of compensating output reduction resulted from downsizing by a high-speed revolution is employed. In the following, a rolling bearing for a fan coupling device, a rolling bearing for an automobile alternator, and a rolling bearing for an idler pulley will be described as examples of the rolling bearing for an automobile electric component or an auxiliary component.

A typical fan coupling device for an automobile has a housing in which a viscous fluid is enclosed and to an outer peripheral surface of which a blower fan is attached, being coupled to a rotor that is directly coupled to an engine via a bearing, and performs air blowing optimal to the engine temperature by controlling an amount of driving torque transmission from the engine and a revolution speed of the fan by utilizing a shear resistance of the viscous fluid that increases and decreases depending on ambient temperature. Accordingly, a rolling bearing for a fan coupling device requires capability of enduring variation in revolution in which the revolution speed changes from 1000 rpm up to 10000 rpm according to variation in engine temperature, as well as a highly inhospitable environment in which high-speed revolution is performed at a revolution speed of 10000 rpm or over under high temperature often at 180 deg C. or above in high-speed driving during summertime.

A typical automobile alternator has a function of generating power by receiving revolution of an engine with a belt, supplying power to an electric load of a vehicle, and charging a battery. Further, a typical idler pulley for automobiles is used as a belt tensioner of a driving belt that transmits the revolution of the engine to an auxiliary component of an automobile, and a function as a pulley giving a tensile force to a belt as a tensioner when an inter-shaft distance is fixed, and has a function as an idler used for changing the traveling direction of the belt and avoiding obstacles to reduce a volume of an engine compartment. The automobile alternator and the idler pulley for automobiles also require capability of enduring a highly inhospitable environment in which high-speed revolution is performed at a revolution speed of 10000 rpm or over under high temperature at 180 deg C. or above.

For lubrication of the rolling bearings for automobile electric components and auxiliary components, grease is mainly used. However, rapid acceleration/deceleration, and inhospitable use conditions such as high temperature and high-speed revolution cause a problem of premature separation of a rolling surface of the rolling bearing due to hydrogen embrittlement.

Further, a step-up gear or a reduction gear (also integrally referred to as "step-up/reduction gear") in which a rolling bearing is employed is used in various devices. Examples of such gears include an reduction gear for industrial machine (circulating oiling), a reduction gear for robot (oil bath lubrication), a reduction gear for mill (circulating oiling or oil bath lubrication), a reduction gear for construction machine (oil bath lubrication), and a step-up gear for wind generator (circulating oiling or oil bath lubrication). Within the brackets, types of oil lubrication for gear units including the rolling bearing are shown, which specifically include oil bath lubrication, jet oiling, circulating oiling, oil-mist lubrication, air-oil lubrication, splash oiling, and hydraulically-actuated oil dipping, but are roughly categorized into oil bath lubrication and circulating oiling. When the rolling bearing is used under a condition in which water mixes into a lubricant, or a condition in which the rolling bearing involves slipping, water and lubricant are decomposed to produce hydrogen. By the produced hydrogen entering into steel, premature separation may often be caused due to hydrogen embrittlement. When metallic contact occurs between contact surfaces of the contact elements and a newly-formed metallic surface is exposed, production of hydrogen due to decomposition of water and the lubricant and entrance of the hydrogen into steel is promoted.

Further, a transmission for automobiles is a device for converting power of an engine into optimal torque and revolution speed and transmits it to vehicle wheels, and a rolling bearing used in such a transmission is desired to follow a large load capacity and high rotation capacity, in particular a radical change in the revolution speed that accompanies shift transmission. Moreover, as the bearing bites a foreign matter within a transmission casing, an improvement of durability is sought by preventing a foreign matter from entering by attaching a tight seal or providing a special thermal treatment. Even though a tight seal is attached, a main purpose of the tight seal is to prevent a foreign matter from entering. The tight seal does not have a function of preventing entrance of a fluid, and therefore oil filled in the transmission comes into the bearing through a space around the tight seal. Until the oil comes into the bearing, grease previously enclosed in the bearing provides lubrication.

In recent years, as in a case of a CVT (continuously variable transmission), under an environment in which a lubricant with low viscosity is used as transmission oil, there are cases in which separation occurs in bearing races far earlier than separation due to fatigue and biting of foreign matters occurs (premature separation described above). This type of separation is characterized by a number of cracks microstructurally produced in a surface where the separation occurs. Such cracks are not observed in conventional separation. As described above, it is considered that this type of separation occurs because slipping between a race and a rolling body occurs, hydrogen is produced by decomposition of components of grease within a bearing or of transmission oil that has come into the bearing, and the produced hydrogen enters steel to cause embrittlement of the steel. The lower the viscosity of lubricant components is, the more easily slipping occurs. Therefore, decomposition of the components and premature separation due to the hydrogen embrittlement occur more easily.

Further, due to its intended use, a hub bearing for an automobile is used not only for driving in fine weather, but under extremely severe use environments such as driving in rainy weather, or along a rough road and coast. Entrance of moisture and a foreign matter into the hub bearing is restrained by sealing, but not completely. Therefore, it is not possible to completely prevent moisture and a foreign matter from entering the hub bearing and from being mixed into a lubricating agent such as grease enclosed in the bearing. Moreover, reduction of torque of the hub bearing is demanded in view of energy saving, and light-contact sealing is considered as one method. This increases possibility of entrance of water.

In the hub bearing for an automobile, when used under such a condition in which water is mixed into the lubricating agent, an inhospitable use condition such as rapid acceleration/deceleration, and a condition in which slipping is involved, premature separation due to the hydrogen embrittlement occurs in a rolling surface of the hub bearing, and it becomes difficult to use the hub bearing for a long period of time.

Use of bearing steel, or the like, with an increased Cr content is proposed as one conventional technique for improving a resistance of the rolling bearing to the hydrogen embrittlement to prevent occurrence of the premature separation described above (see Patent Document 1). According to this technique, Cr whose content in steel is increased is combined with oxygen over the rolling surface, an oxide layer (passive film) of Cr is formed over the rolling surface, and this oxide layer prevents hydrogen from entering steel, and thus prevents premature separation due to hydrogen embrittlement from occurring. Further, a method of adding a passivation agent (see Patent Document 2), or bismuth dithiocarbamate (see Patent Document 3) to grease is proposed as an example of a method for preventing the premature separation by modification of the lubricating agent.

PRIOR ART DOCUMENT

Patent Documents

Patent Document 1: JP 2000-282178 A
Patent Document 2: JP 03-210394 A
Patent Document 3: JP 2005-42102 A Non Patent Documents Non Patent Document 1: L. Grunberg, Proc. Phys. Soc. (London), B66 (1953) 153-161.
Non Patent Document 2: L. Grunberg and D. Scott, J. Inst. Petrol., 44 (1958) 406-410.
Non Patent Document 3: L. Grunberg, D. T. Jamieson and D. Scott, Philosophical magazine, 8 (1963) 1553-1568.
Non Patent Document 4: P. Schatzberg and I. M. Felsen, Wear, 12 (1968) 331-342.
Non Patent Document 5: P. Schatzberg, J. Lub. Tech., 231 (1971) 231-235.
Non Patent Document 6: K. Tamada and H. Tanaka, Wear, 199 (1996) 245-252.
Non Patent Document 7: H. Mikami and T. Kawamura, SAE Paper, (2007), No. 2007-01-0113.
Non Patent Document 8: Y. Matsubara and H. Hamada, Bearing Steel Technology, ASTM STP1465, J. M. Beswick Ed., (2007), 153-166.
Non Patent Document 9: D. Brooksbank and K. W. Andrew, J. Iron Steel Inst., June (1968) 595-599
Non Patent Document 10: D. Brooksbank and K. W. Andrew, J. Iron Steel Inst., April (1969) 474-483
Non Patent Document 11: Akihide Nagao, Shigeru Kuramoto, Mikihiro Kanno, Tetsuo Shiragami, Iron and Steel, 86 (2000) 24-31
Non Patent Document 12: Kenichi Takai, Junichi Seki, Goro Yamauchi, Yoshikazu Homma, J. Japan Inst. Met. Mater., 58 (1994) 1380-1385
Non Patent Document 13: Kenichi Takai, Yoshikazu Homma, Kaori Tsutsui, Michihiko Nagumo, J. Japan Inst. Met. Mater., 60 (1996) 1155-1162
Non Patent Document 14: Toshimitsu Yokobori, Takenao Nemoto, Koji Sato, Tetsuya Yamada, Transactions of the JSME A, 59 (1993) 2120-2127

SUMMARY OF THE INVENTION

Problems to be Solved by the Invention

However, in the case of the steel according to Patent Document 1, carbide may often be coarsened by adding a large amount of Cr and become a source of stress concentration, resulting in premature separation. Further, a passive film has not only an effect of delaying diffusion of hydrogen, but an effect of promoting of adsorption of produced hydrogen to a surface of the steel. In a case of a rolling bearing that is used intermittently, hydrogen is dissipated at the time of stoppage. Therefore, delaying entrance of hydrogen into steel is effective for preventing premature separation. However, in a case in which a rolling bearing is continuously used, an amount of hydrogen entering steel increases as the passive film adsorbs a large amount of hydrogen, and therefore premature separation occurs. It is expected that rolling bearings activated continuously unattended increase in the future, and the conventional techniques are insufficient for such a purpose. In addition, special steel is expensive, and international procurement is difficult.

Further, as the use conditions for rolling bearings become increasingly inhospitable in recent years, the methods of adding the passivation agent according to Patent Document 2 and bismuth dithiocarbamate according to Patent Document 3 are insufficient as a method of preventing premature separation.

Moreover, regarding wind generators (having a step-up gear), because of decreased freedom for installation sites along with increased needs, a trend in energy conversion, and an improvement in analysis of wind conditions, it is considered that the number of cases in which wind generators are installed on the ocean and in the mountainous area where installation has conventionally not been considered is increasing. In view of the above circumstances, even in an inhospitable use environment that is unlikely considered so far, it is desired to prevent premature separation in rolling bearings and the like in the step-up gear. In particular, as it is also expected that an access to the device becomes difficult, needs for preventing premature separation for an extended period of time and for reducing a frequency of maintenance are considered to be increased.

The present invention is made in order to address such problems, and an object of the present invention is to provide a rolling device in which hydrogen is not easily accumulated within a roller element made of steel, such as an inner race and an outer race, and premature separation due to hydrogen embrittlement is prevented from occurring.

Means for Solving the Problem

A rolling device according to the present invention is a rolling device having a roller element made of steel, wherein at least a part of oxide-based inclusions included in the steel of the roller element is covered by MnS, and a ratio of a number of oxide-based inclusions covered by MnS is over 40% of a total number of oxide-based inclusions having maximum diameter of 3 μm or greater in the steel constituting the roller element. As used herein, the "rolling device" refers to a component including an element of rolling or slipping, such as a rolling bearing and a gear. Further, the "maximum diameter" refers to a diameter of oxide-based inclusions where oxide-based inclusions are substantially spherical, and a maximum diameter where oxide-based inclusions are expanded in any direction (e.g., rolling direction).

An element composition of the steel is such that C is no smaller than 0.95 mass percent and no greater than 1.1 mass percent, Si is smaller than 0.35 mass percent, Mn is smaller than 0.5 mass percent, S is smaller than 0.025 mass percent, Cr is no smaller than 1.4 mass percent and smaller than 1.6 mass percent, and remaining elements are iron and impurities.

The roller element is configured by performing a nitriding treatment to a superficial layer of the roller element, and a surface concentration of nitrogen is from 0.05 weight percent to 0.6 weight percent. Further, a Vickers hardness difference ΔHV between a site at a depth of 0.05 mm from a surface of the roller element and a site at a depth where no nitrogen is included is no smaller than 60.

The rolling device is a rolling bearing including an inner race, an outer race, and rolling bodies, and at least one selected from the inner race, the outer race, and the rolling bodies is the roller element.

In a case in which the rolling device is the above rolling bearing, the rolling bearing is a rolling bearing for an automobile electric component or an auxiliary component, the rolling bearing rotatably supporting a rotating shaft to a static member, the rolling bearing being driven to rotate by an output from an engine. In particular, the rolling bearing is a rolling bearing used for an alternator, a fan coupling device, or an idler pulley, for an automobile.

In a case in which the rolling device is the above rolling bearing, the rolling bearing is a rolling bearing for a step-up/reduction gear that steps up or reduces revolution of an input shaft using a planetary gear and transmits the revolution to the output shaft, the rolling bearing rotatably supporting the planetary gear while lubricated with oil. In particular, the step-up/reduction gear is a step-up gear used in a wind generator.

In a case in which the rolling device is the above rolling bearing, the rolling bearing is a rolling bearing for a transmission that is disposed within a transmission that shifts and transmits revolution of an input shaft and revolution of an output shaft, the rolling bearing rotatably supporting one of the input shaft, the output shaft, and a member that rotates along with the revolution. In particular, the transmission is of a variable speed type that shifts and transmits the revolution of the input shaft and the revolution of the output shaft in a non-step manner.

The rolling device is a hub bearing that is provided with a component having a rolling contact portion and that is configured to rotatably support a wheel of an automobile, and the component is the roller element.

Effect of the Invention

The rolling device according to the present invention is the rolling device having the roller element made of steel, wherein at least a part of oxide-based inclusions included in the steel of the roller element is covered by MnS, and the ratio of the number of oxide-based inclusions covered by MnS is over 40% of the total number of oxide-based inclusions having maximum diameter of 3 μm or greater in the steel constituting the roller element. Therefore, covering a majority of the oxide-based inclusions that are inevitably contained by soft MnS relieves the tensile stress field formed around the oxide-based inclusions. With this, hydrogen may not be easily accumulated within the steel, and it is possible to prevent premature separation due to hydrogen embrittlement from occurring.

As a result, the rolling device according to the present invention may be suitably used as a rolling bearing having superior bearing life duration in automotive electric components and auxiliary components such as an alternator, an electromagnetic clutch for a car air-conditioner, a fan coupling device, an intermediate pulley, and an electric fan motor.

Further, by applying to a rolling bearing of a step-up gear in a wind generator, it is possible to extend the life duration of the devices, and a frequency of maintenance may be reduced even when it is difficult to access the devices.

Moreover, as in a case of a CVT, even under an environment in which a lubricant with low viscosity is used as transmission oil, it is possible to prevent premature separation.

Furthermore, even under inhospitable use conditions where water comes inside (e.g., into grease) during an operation of a hub bearing, it is possible to suitably use as a hub bearing having long life duration.

MODE FOR CARRYING OUT THE INVENTION

Figure 1:
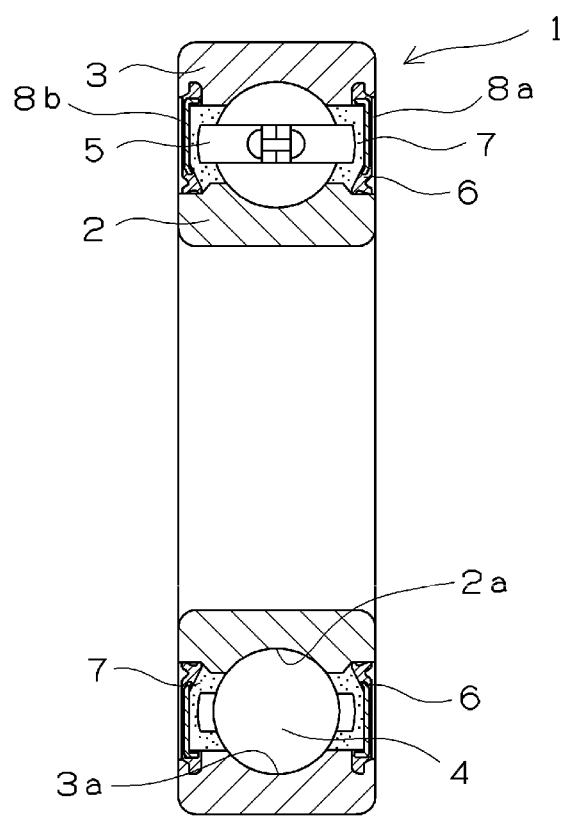
FIG. 1 is a sectional view of a rolling bearing as one example of a rolling device according to the present invention.

In order to improve a resistance to hydrogen embrittlement of a rolling device such as a rolling bearing, a focus is placed on oxide-based inclusions that are inevitably included in steel constituting the roller element. When the roller element is abraded due to slipping or the like, a newly-formed surface is formed, water or a lubricating agent that is mixed is decomposed, and hydrogen is produced. A part of the produced hydrogen enters the steel. Around oxide-based inclusions, a tensile stress field is formed (Non Patent Documents 9, 10). Hydrogen has a characteristic of accumulating in the tensile stress field (Non Patent Documents 11-14). On the other hand, covering a majority of the oxide-based inclusions (over 40%) by soft MnS (about 150 HV) relieves the tensile stress field so that hydrogen may not be easily accumulated. It is found that, as a result, a resistance to hydrogen embrittlement is improved. The present invention is based on such findings.

Particularly, among hydrogen entering steel, diffusible hydrogen is considered to be a cause of hydrogen embrittlement. Diffusible hydrogen is hydrogen that is not trapped within a crystal grain boundary and is capable of moving relatively freely. At room temperature, diffusible hydrogen is emitted from steel outside over time. For example, diffusible hydrogen may be defined as hydrogen emitted by heating up to 200 deg C., and non-diffusible hydrogen may be defined as hydrogen emitted from steel finally at heating temperature over 200 deg C. A total amount of diffusible hydrogen and non-diffusible hydrogen is an amount of hydrogen that has come into the steel.

Steel that constitutes a roller element inevitably contains oxide-based inclusions. The rolling device according to the present invention requires that a ratio of a number of oxide-based inclusions covered by MnS (coverage) is over 40% of a total number of oxide-based inclusions whose maximum diameter is 3 μm or greater in the steel constituting the roller element. The coverage may be expressed by the following formula.

Coverage (%)=(number of oxide-based inclusions covered by MnS among oxide-based inclusions whose maximum diameter is 3 μm or greater)/(total number of oxide-based inclusions whose maximum diameter is 3 μm or greater)×100

The higher the coverage is, the more preferable it is. The coverage of 50% or greater is more preferable, and 90% or greater is further preferable. As used herein, "covered by MnS" means a state in which MnS precipitates by using an oxide-based inclusion as a core and is coated around the oxide-based inclusion, and this state includes both cases in which an oxide-based inclusion is completely covered and in which only a part of an oxide-based inclusion is covered. Further, MnS is in a linear shape extended in a rolling direction.

In calculation of the coverage, target oxide-based inclusions are those having a maximum diameter of 3 μm or greater. A presence state of oxide-based inclusions whose maximum diameter is smaller than 3 μm (coating state of MnS) hardly contributes to premature separation due to hydrogen embrittlement. Further, a presence state of oxide-based inclusions whose maximum diameter is 3 μm or greater may be easily observed by using an optical microscope.

Moreover, a lower limit of the maximum diameter of target oxide-based inclusions may be greater, and for example may be 5 μm or greater, or 10 μm or greater. Even if the lower limit of the maximum diameter of oxide-based inclusions whose maximum diameter is 3 μm or greater is increased, the coverage described above is substantially the same.

A manufacturing method or the like employing the above range of the coverage of oxide-based inclusions by MnS is not particularly limited. In general, when a cooling speed is high as in continuous cast of steel, oxide-based inclusions and MnS as soft inclusions are separately precipitated, and therefore the coverage tends to become low. On the other hand, when a cooling speed is low as in ingot cast of steel, oxide-based inclusions constitute cores of precipitation of MnS as soft inclusions, and therefore the coverage tends to become high.

Preferably, an element composition of the steel used for the roller element of the rolling device according to the present invention is as follows: C is no smaller than 0.95 mass percent and no greater than 1.1 mass percent, Si is smaller than 0.35 mass percent, Mn is smaller than 0.5 mass percent, S is smaller than 0.025 mass percent, Cr is no smaller than 1.4 mass percent and smaller than 1.6 mass percent, and the remaining elements are iron and impurities. Details of this element composition will be described below.

C: No Smaller Than 0.95 Mass Percent and No Greater Than 1.1 Mass Percent

C (carbon) is an element necessary for ensuring the strength of steel. Further, C has a large influence on hardenability, and contributes to an improvement of fatigue strength by increasing hardness and depth of a quench-hardened layer. These effects may be sufficiently obtained by C within the above range.

Si: Smaller Than 0.35 Mass Percent

Si (silicon) suppresses growth of austenite particles during quench-heating, and therefore is desired to be positively added under normal conditions. However, forgeability and grindability are extremely deteriorated by adding Si. In view of the above, an amount of Si is made smaller than 0.35 mass percent.

Mn: Smaller Than 0.5 Mass Percent

Mn (manganese) is an element that effectively contributes to an improvement of strength and hardenability. It is considered that when an amount is excessive, Mn is segregated on a grain boundary to cause cracking in the grain boundary. Therefore, an amount smaller than 0.5 mass percent is appropriate.

S: Smaller Than 0.025 Mass Percent

S (sulfur) is an element forming MnS in steel. On the other hand, S may be segregated on a grain boundary of austenite, to decrease the strength of the grain boundary as well as the fatigue strength. In view of the above, an amount of S is made smaller than 0.025 mass percent.

Cr: No Smaller Than 1.4 Mass Percent and Smaller Than 1.6 Mass Percent

Cr (chromium) is an element that contributes to improvements of strength, abrasion resistance, and fatigue strength by forming stable carbide and improving hardenability. On the other hand, if Cr is contained excessively, forgeability and grindability are reduced. In order to obtain these effects sufficiently, an amount within the above range is appropriate.

Examples of steel having the above element composition include those conforming to high-carbon chromium bearing steel SUJ2 (JIS standard), 52100 (AISI standard or SAE standard) that is a material comparable to SUJ2, 100Cr6 (DIN standard), and GCr15 (GSB standard). Even if the above element composition is satisfied, steel that does not satisfy the above predetermined coverage (%) may not be used for the rolling device according to the present invention. For the rolling device according to the present invention, it is preferable to use steel satisfying both of the above predetermined coverage (%) and the above element composition.

It is preferable to provide a nitriding treatment to a superficial layer of steel used for the roller element of the rolling device according to the present invention. When the roller element includes inner and outer races (race rings), the nitriding treatment is provided to rolling surfaces of the race rings. The nitriding treatment is performed in an atmosphere in which an ammonia gas is added to an RX gas at temperature of 850 deg C., for example. Providing a nitriding treatment to the rolling surfaces and quenching make the race rings insusceptible to plastic deformation, and improve a resistance to hydrogen embrittlement. Preferably, a surface concentration of nitrogen of the rolling surfaces is from 0.05 weight percent to 0.6 weight percent. When the surface concentration of nitrogen is smaller than 0.05 weight percent, an improvement in life duration by nitriding may often not be provided. On the other hand, when the surface concentration of nitrogen exceeds 0.6 weight percent, a large amount of Cr carbonitride is produced, and there is a case in which sufficient hardenability may not be ensured as Cr that contributes to hardenability decreases.

A nitriding treatment is provided to perform quenching, and then tempering is performed. A thermal treatment (quenching and tempering condition) is not particularly limited, and may be a known condition. For example, first, steel is heated up to a predetermined temperature equal to or higher than an A1 point, and maintained at this temperature for a predetermined period of time. At this time, the steel is heated in an atmosphere, for example, in which an ammonia gas is added to a RX gas, and with this a nitriding treatment is provided to a steel superficial layer. Then, by immersing the steel in oil or the like, the steel is cooled from the temperature equal to or higher than the A1 point down to a temperature equal to or lower than a MS point, thereby completing the quench-hardening step. Further, the quench-hardened steel is heated up to a predetermined temperature equal to or lower than the A1 point, maintained at this temperature for a predetermined period of time, and then cooled down to room temperature, for example, thereby completing the tempering step. Through these steps, the thermal treatment is completed.

The rolling device according to the present invention is a rolling bearing, a gear, or a component of these. The rolling device is often used under an environment in which moisture is mixed or comes into a lubricant used for lubrication or into a use atmosphere. Further, the rolling device is a component that is susceptible to hydrogen because of its movement form. Specifically, the rolling device is used under a condition in which metallic contact occurs between contact elements and in which slipping is involved, and therefore hydrogen easily comes into steel as a newly-formed metallic surface is exposed at a surface of a steel member.

As one example of the rolling device according to the present invention, a rolling bearing will be described with reference to FIG. 1. FIG. 1 is a sectional view of a rolling bearing (deep groove ball bearing). A rolling bearing 1 is provided with an inner race 2 and an outer race 3 that are concentric and respectively having an inner race rolling surface 2a on an outer peripheral surface and an outer race rolling surface 3a on an inner peripheral surface, and a plurality of rolling bodies 4 are disposed between the inner race rolling surface 2a and the outer race rolling surface 3a. The rolling bodies 4 are held in a cage 5. Further, openings 8a, 8b on both ends in an axial direction of the inner and the outer races are sealed by sealing members 6 as needed, and grease 7 is enclosed around the rolling bodies 4. At least one of the inner race 2, the outer race 3, and the rolling bodies 4 corresponds to the roller element described above, and made of the predetermined steel.

A lubricating agent such as the grease 7 is provided over rolling surfaces between the inner race 2, the outer race 3 and the rolling bodies 4 to provide lubrication. As the lubricating agent, any type of lubricant and grease may be used. When moisture is mixed in the lubricating agent, hydrogen is produced due to decomposition of the mixed water and the lubricating agent itself, and promoted to enter the steel. As the rolling device according to the present invention (rolling bearing) uses the steel described above that is highly resistant to hydrogen embrittlement for the inner race and the outer race as the roller element, it is possible to effectively prevent premature separation due to hydrogen embrittlement from occurring even under a condition in which moisture is mixed into the lubricating agent.

While expensive, the rolling bodies 4 in the rolling bearing may be made of silicon nitride that does not exhibit hydrogen embrittlement. Further, under a condition in which power distribution occurs, premature separation due to hydrogen embrittlement is less likely to occur when the cage 5 is a cage made of a metal such as steel or a copper alloy, than a resin cage.

The sealing member 6 may be a metallic or a rubber-molded singular body, or a composite body of a rubber molded body with a metallic plate, a plastic plate, a ceramic plate, or the like. A composite body of a rubber molded body and a metallic plate is preferable considering durability and facility of fixation.

Although a ball bearing is taken as an example of the rolling bearing as the rolling device, the rolling bearing may be other types of bearings such as a cylindrical roller bearing, a conical roller bearing, a self-aligning roller bearing, a needle roller bearing, a thrust cylindrical roller bearing, a thrust conical roller bearing, a thrust needle roller bearing, and a self-aligning thrust roller bearing.

[A: A Case that Rolling Device is a Rolling Bearing for an Automobile Electric Component or an Auxiliary Component]

Figure 2:
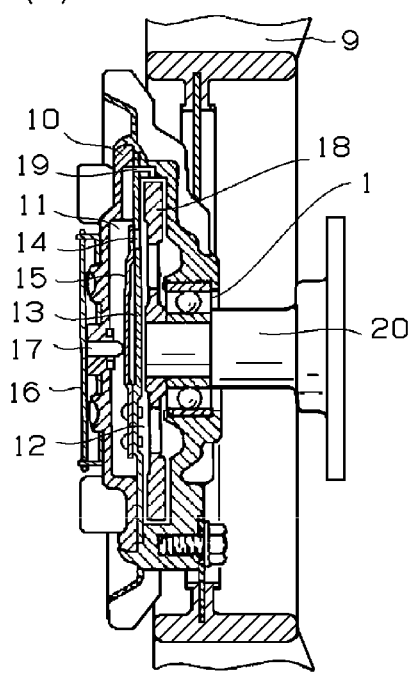
FIG. 2 is a sectional view of a fan coupling device using the rolling bearing as the rolling device according to the present invention.
Figure 2:
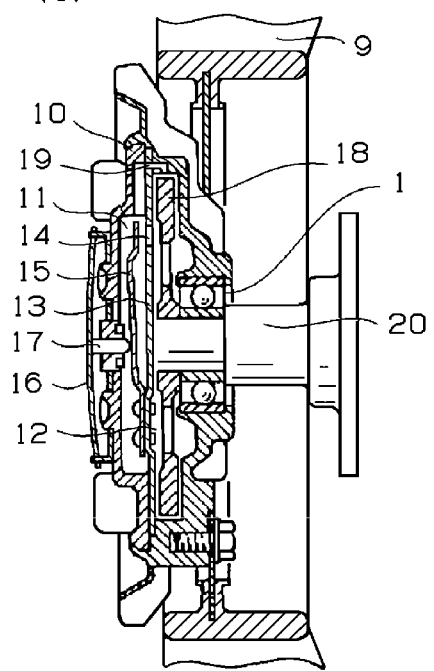

Similarly to common rolling bearings, a rolling bearing for an automobile electric component or an auxiliary component is a component susceptible to hydrogen. An overall structure of the rolling bearing is the same as that illustrated in FIG. 1. One example of the automobile electric components and auxiliary components to which this type of rolling bearing is applied is shown in FIG. 2(a) and FIG. 2(b). FIG. 2(a) and FIG. 2(b) show sectional views of a structure of a fan coupling device. The fan coupling device is provided with an oil chamber 11 in which a viscous fluid such as silicone oil is filled within a casing 10 that supports a cooling fan 9, and an agitation chamber 12 in which a driving disk 18 is incorporated. A port 14 is provided for a divider 13 between the both chambers 11, 12, and one end of a spring 15 that opens and closes the port 14 is fixed to the divider 13. Further, a bimetal 16 is attached to a front surface of the casing 10, and a piston 17 of the spring 15 to the bimetal 16. When temperature of the air that has passed a radiator is no higher than a set temperature, e.g., no higher than 60 deg C., the bimetal 16 is flattened, the piston 17 presses the spring 15, and the spring 15 closes the port 14. Moreover, when temperature of the air exceeds the set temperature, the bimetal 16 bends outwardly as illustrated in FIG. 2(b), the piston 17 releases pressing of the spring 15, and the spring 15 elastically deforms to open the port 14.

In an operating state of the fan coupling device thus configured, when the temperature of the air that has passed the radiator is lower than the set temperature the bimetal 16, as the port 14 is closed by the spring 15 as illustrated in FIG. 2(a), the viscous fluid within the oil chamber 11 does not flow into the agitation chamber 12, and the viscous fluid within the agitation chamber 12 is supplied, by rotation of the driving disk 18, to the oil chamber 11 through a circulation hole 19 provided for the divider 13. Accordingly, as an amount of the viscous fluid within the agitation chamber 12 becomes small, and a shear resistance of the rotation of the driving disk 18 becomes smaller, transmission torque to the casing 10 decreases and the cooling fan 9 supported by the rolling bearing 1 performs low-speed revolution. When the temperature of the air that has passed the radiator exceeds the set temperature of the bimetal 16, the bimetal 16 bends outwardly as illustrated in FIG. 2(b), and the piston 17 releases pressing of the spring 15. At this time, as the spring 15 elastically deforms to a direction for moving away from the divider 13, the port 14 is opened, and the viscous fluid within the oil chamber 11 flows through the port 14 into the agitation chamber 12. Accordingly, the shear resistance of the viscous fluid due to rotation of the driving disk 18 increases, rotation torque to the casing 10 increases, and the cooling fan 9 supported by the rolling bearing 1 performs high-speed revolution.

As described above, with the fan coupling device, as a revolution speed of the cooling fan 9 changes according to the temperature change, it is possible to put forward warm-up, to prevent excessive cooling of cooling water, and to effectively cool an engine. The cooling fan 9 is virtually separated from a driving shaft 20 when the temperature of the engine is low, and virtually coupled to the driving shaft 20 when the temperature is high. As described above, the rolling bearing 1 is used in a wide range of temperature from low temperature to high temperature, and under a rapid acceleration/deceleration condition in which the revolution speed changes largely according to the temperature change. Here, at least one bearing member of the rolling bearing 1 selected from the inner race, the outer race, and the rolling bodies corresponds to the roller element described above, and configured by the predetermined steel described above.

Figure 3:
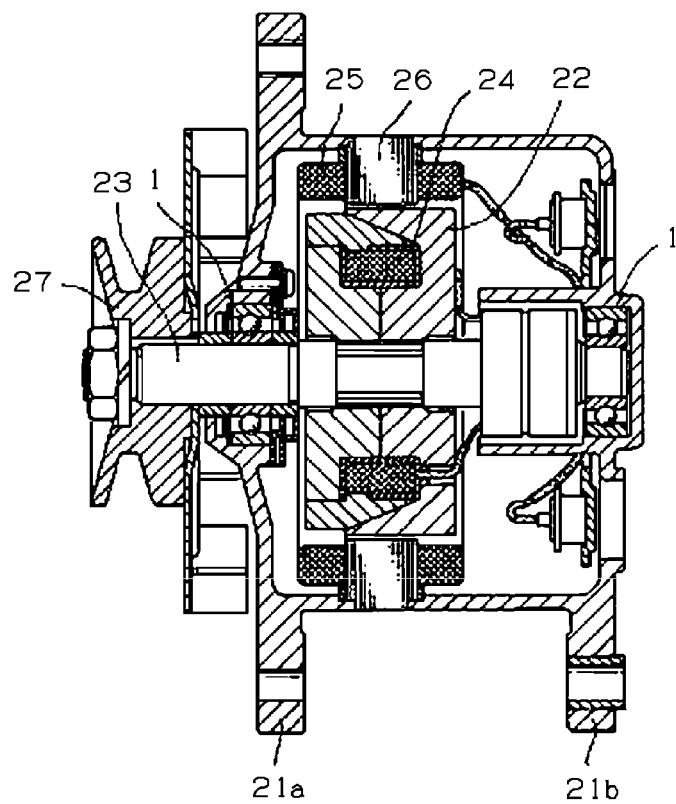
FIG. 3 is a sectional view of an alternator using the rolling bearing as the rolling device according to the present invention.

A different example of the automobile electric components and auxiliary components to which this type of rolling bearing is applied is shown in FIG. 3. FIG. 3 is a sectional view of a structure of an alternator. The alternator is configured such that a rotor shaft 23 attached to a rotor 22 is rotatably supported by a pair of frames 21a, 21b that constitute a housing as a static member via the pair of rolling bearings 1, 1. A rotor coil 24 is attached to the rotor 22, and three stator coils 26 are attached to a stator 25 disposed on an outer circumference of the rotor 22, at a phase of 120°. The rotor shaft 23 is driven to rotate based on rotation torque transmitted via a belt (not shown) to a pulley 27 attached to a tip of the shaft. The pulley 27 is in a cantilever state, and attached to the rotor shaft 23. As oscillation occurs along with high-speed revolution of the rotor shaft 23, one of the rolling bearings 1 supporting the pulley 27 is subjected to particularly severe load. Here, at least one bearing member of the rolling bearing 1 selected from the inner race, the outer race, and the rolling bodies corresponds to the roller element described above, and configured by the predetermined steel described above.

Figure 4:
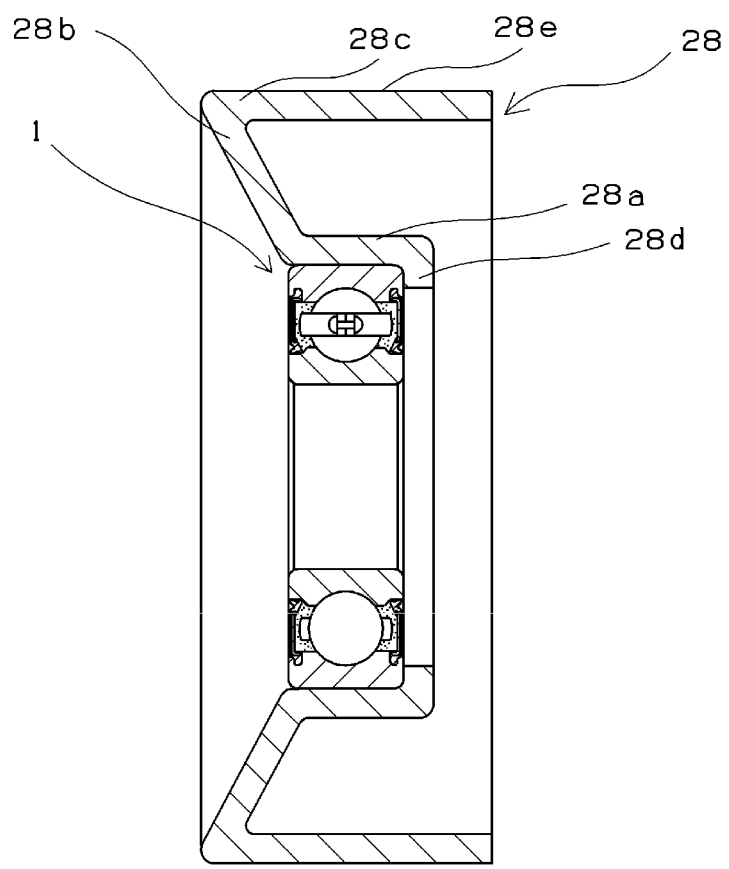
FIG. 4 is a sectional view of an idler pulley using the rolling bearing as the rolling device according to the present invention.

A different example of the automobile electric components and auxiliary components to which this type of rolling bearing is applied is shown in FIG. 4. FIG. 4 is a sectional view of a structure of an idler pulley used as a belt tensioner for an automobile auxiliary component driving belt. The pulley includes a pulley main body 28 made by steel-plate press, and a single line of deep groove ball bearing 1 fitted within an inner circle of the pulley main body 28. The pulley main body 28 is an annular body including an inner cylindrical portion 28a, a flange portion 28b extending outwardly from one end of the inner cylindrical portion 28a, an outer cylindrical portion 28c extending axially from the flange portion 28b, and a brimmed portion 28d extending inwardly from the other end of the inner cylindrical portion 28a. Within the inner cylindrical portion 28a, the outer race 3 of the deep groove ball bearing 1 illustrated in FIG. 1 is fitted. Around the outer cylindrical portion 28c, there is provided a pulley circumferential surface 28e in contact with a belt that is driven by an engine. By bringing the pulley circumferential surface 28e into contact with the belt, the pulley functions as the idler. Here, at least one bearing member of the rolling bearing 1 selected from the inner race, the outer race, and the rolling bodies corresponds to the roller element described above, and configured by the predetermined steel described above.

[B: A Case that Rolling Device is a Hub Bearing]

Figure 5:
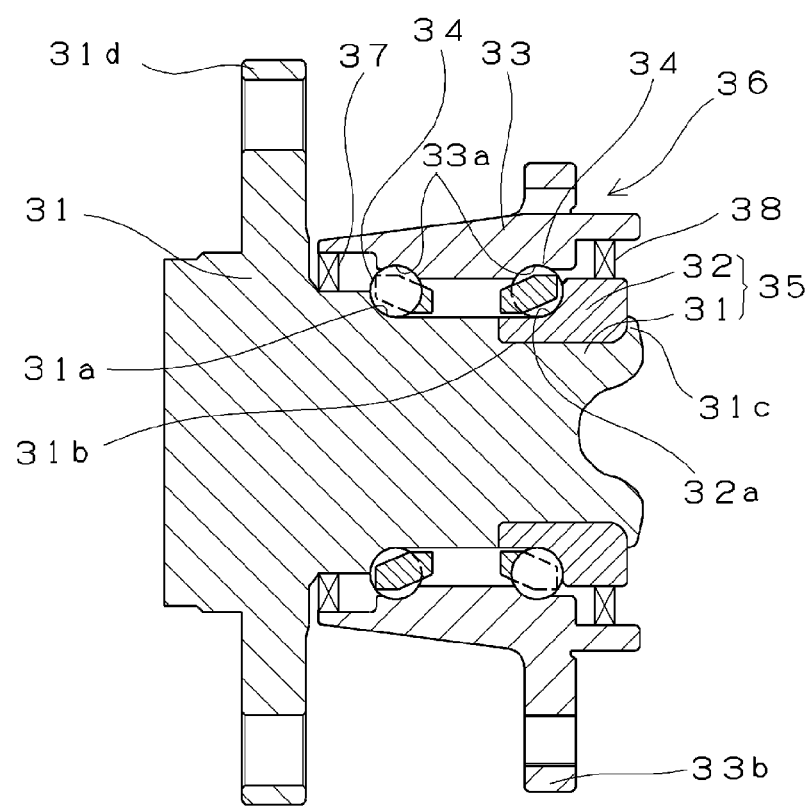
FIG. 5 is a sectional view of a hub bearing using the rolling bearing as the rolling device according to the present invention.

Similarly to common rolling bearings, a hub bearing is a component susceptible to hydrogen. One example of the hub bearing (third-generation hub bearing for a trailing wheel) is shown in FIG. 5. FIG. 5 is a sectional view of a structure of the hub bearing. A hub bearing 36 is provided with an inner member 35 having a hub ring 31 and an inner race 32, an outer member 33 as an outer race, and a plurality of lines of rolling bodies 34, 34. The hub ring 31 is integrally provided with, on one end, a wheel attachment flange 31d for attaching a wheel (not shown), an inner rolling surface 31a along an outer circumference, and a small-diameter stepped portion 31*b* that extends axially from the inner rolling surface 31*a*. As used herein, "outward" with respect to the axial direction means "outward" in the across-the-width direction in a state assembled to a vehicle, and "inward" means a central side in the across-the-width direction. The small-diameter stepped portion 31*b* described above is positioned axially inward from the inner rolling surface 31*a*.

The inner race 32 having an inner rolling surface 32*a* provided around an outer circumference is pressed into the small-diameter stepped portion 31*b* of the hub ring 31. Then, a swage portion 31*c* formed by plastically deforming an end of the small-diameter stepped portion 31*b* of the hub ring 31 radially outward prevents the inner race 32 from slipping out from the hub ring 31 in the axial direction. The outer member 33 is integrally provided with, along an outer circumference, a vehicle attachment flange 33*b*, and a plurality of lines of the rolling bodies 34, 34 are housed, in a freely rolling manner, between the outer rolling surface 33*a*, 33*a* along an inner circumference and the inner rolling surfaces 31*a*, 32*a* facing the plurality of lines of outer rolling surfaces 33*a*, 33*a*.

Grease may be enclosed within a space surrounded by a sealing member 37, the outer member 33, a sealing member 38, the inner member 35, and the hub ring 31. The grease covers the plurality of lines of rolling bodies 34, 34 between the outer member 33 and the inner member 35, and provides lubrication for rolling contact between rolling surfaces of the rolling bodies 34, 34 with the inner rolling surfaces 31*a*, 32*a* and the outer rolling surfaces 33*a*, 33*a*.

At least one component having a rolling contact portion of the hub bearing corresponds to the roller element described above, and configured by the predetermined steel described above. Examples of the component include the inner race 32 in the example shown in FIG. 5. Further, examples of a material used for components other than the component made of the predetermined steel in the hub bearing include bearing steel, blister steel, and carbon steel for mechanical structures. Among these, it is preferable to use carbon steel for mechanical structures such as S53C, that has excellent forgeability and is inexpensive. Generally, the carbon steel is used after ensuring rolling fatigue strength by performing a high-frequency thermal treatment.

For example, it is possible to consider a configuration in which (1) the inner race 32 is made of the predetermined steel in which oxide-based inclusions are covered by MnS, (2) the hub ring 31 is made of carbon steel for mechanical structures such as S53C, the inner rolling surface 31*a*, a sealing land portion with which the sealing member 37 is in sliding contact, and the small-diameter stepped portion 31*b* have surface hardness in a range from 58 HRC to 64 HRC by high-frequency quenching, and (3) the outer member 33 is made of carbon steel for mechanical structures such as S53C, and the plurality of lines of outer rolling surfaces 33*a*, 33*a*, an inner end surface in which the sealing members 37, 38 are fitted have surface hardness in a range from 58 HRC to 64 HRC by high-frequency quenching.

[C: A Case that Rolling Device is a Rolling Bearing for a Step-Up/Reduction Gear]

When using a rolling bearing for a step-up/reduction gear for a use where completely released to the atmosphere, moisture is likely mixed from the atmosphere. Further, particularly for a device (having a step-up/reduction gear) used outdoor, even if the device is closed in a macro view, an ambient environment in which a lubricant such as oil bath is in contact is an open system in a micro view because of daily temperature and humidity change. Therefore, it is considered that the device always takes breath between environments inside and outside the device. If external air coming into the device is highly humid, dew condensation occurs within the device, and moisture is mixed into the lubricant. Moreover, if exposed to heavy rain and weather like a wind generator, a larger amount of moisture is considered to be mixed. Thus, the rolling bearing for a step-up/reduction gear is a component susceptible to hydrogen.

Figure 6:
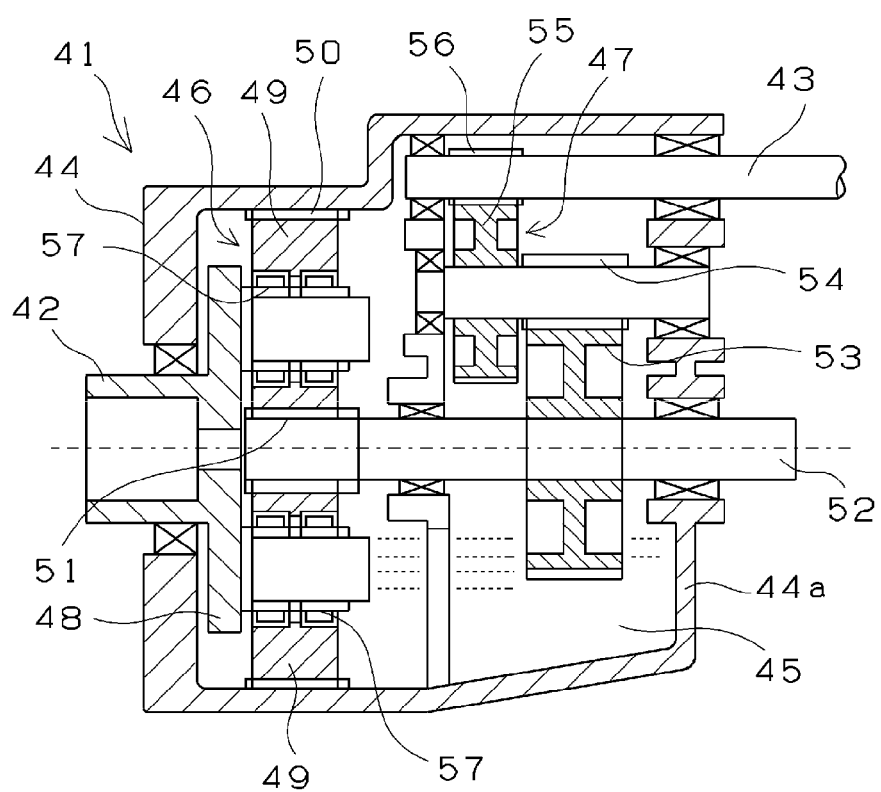
FIG. 6 is a sectional view of a step-up gear using the rolling bearing as the rolling device according to the present invention.

One example of a step-up/reduction gear to which the rolling bearing for a step-up/reduction gear is applied is shown in FIG. 6. FIG. 6 is a sectional view of a step-up gear in a wind generator. A step-up gear body 41 includes a planetary gear mechanism 46 as a primary step-up gear and a secondary step-up gear 47 provided between an input shaft 42 and an output shaft 43. The planetary gear mechanism 46 is configured such that planetary gears 49 are provided for a carrier 48 fixed to the input shaft 42, the planetary gears 49 are meshed with a ring gear 50 as an internal tooth and a sun gear 51, and a shaft fixed to the sun gear 51 is taken as an intermediate output shaft 52. The secondary step-up gear 47 is configured by a gear train that transmits revolution of the intermediate output shaft 52 to the output shaft 43 via a plurality of gears 53-56. Components configuring the planetary gears 49, a rolling bearing 57 supporting the planetary gears 49, the ring gear 50, and the gear 53 of the secondary step-up gear 47 are immersed in a lubricant 45 in a lubricant storage tank 44*a* in a housing 44. The lubricant storage tank 44*a* is circulated by circulating oiling means (not shown) configured by a pump and pipes. The circulating oiling means does not need to be necessarily provided, and an oil bath lubrication method may be employed.

In the configuration illustrated in FIG. 6, as the input shaft 42 rotates, the carrier 48 integral with the input shaft 42 is turned, and the planetary gears 49 supported at a plurality of portions of the carrier 48 revolves in an orbital motion. At this time, the planetary gears 49 rotate while revolving in the orbital motion by being meshed with the fixed ring gear 50. The sun gear 51 is meshed with the planetary gears 49 that rotate while revolving, and the sun gear 51 rotates with respect to the input shaft 42 in a step-up manner. The sun gear 51 is provided for the intermediate output shaft 52 of the secondary step-up gear 47, and the rotation of the sun gear 51 is transmitted to the output shaft 43 after stepped up by the secondary step-up gear 47. In this manner, rotation of a main shaft of a wind turbine (not shown) input to the input shaft 42 is stepped up largely by the planetary gear mechanism 46 and by the secondary step-up gear 47 and transmitted to the output shaft 43, whereby high-speed revolution allowing power generation is supplied from the output shaft 43. While the step-up gear is described in this example, the configuration may be applied to a reduction gear. In this case, the sun gear 51 is in an input side, and the carrier 48 is in an output side.

The planetary gears 49 and the rolling bearing 57 are immersed in the lubricant 45 in the lubricant storage tank 44*a* when revolved by turning of the carrier 48 and reaching the bottom, and therefore a lubricant is supplied. Examples of the lubricant are not particularly limited, and known gear oil for a step-up/reduction gear may be used.

Figure 7:
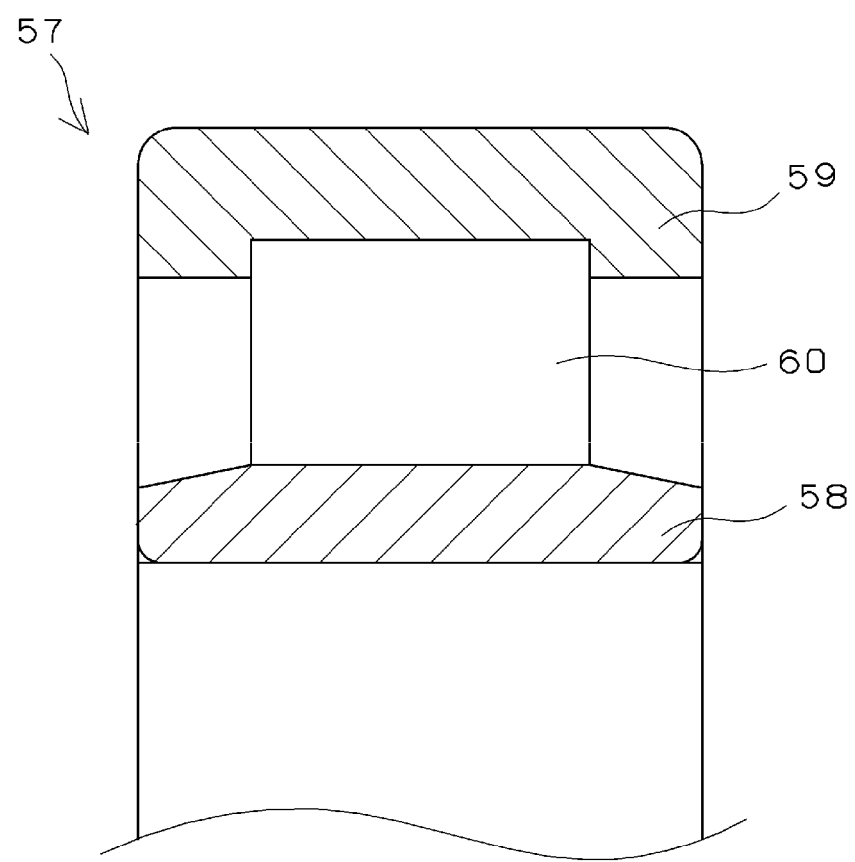
FIG. 7 is a sectional view of the rolling bearing used in the step-up gear illustrated in FIG. 6.

The rolling bearing 57 described above is the rolling bearing as the rolling device according to the present invention. This rolling bearing will be described with reference to FIG. 7. FIG. 7 is a sectional view of the rolling bearing (cylindrical roller bearing). The rolling bearing 57 is provided with an inner race 58 and an outer race 59 that are concentric and respectively having an inner race rolling surface on an outer peripheral surface and an outer race rolling surface on an inner peripheral surface, and a plurality of rolling bodies (cylindrical rollers) 60 are disposed between the inner race rolling surface and the outer race rolling surface. At least one of the inner race 58, the outer race 59, and the rolling bodies 60 corresponds to the roller element described above, and made of the predetermined steel. The rolling bearing 57 illustrated in the figure is assumed to be a bearing of a full roller type without a cage, but may include a cage for holding rolling bodies as needed. Further, it is assumed that the outer race 59 is brimmed on both ends, and the inner race 58 is not brimmed. Contrary to this, it is possible to employ a configuration in which the outer race 59 is not brimmed, and the inner race 58 is brimmed on both ends.

A material and the like of the cage is the same as that shown in FIG. 1. Further, while FIG. 7 shows the example of a cylindrical roller bearing, it is possible to use other types of a roller bearing such as a conical roller bearing, a self-aligning roller bearing, or a needle roller bearing, or a ball bearing such as a deep groove ball bearing.

[D: A Case that Rolling Device is a Rolling Bearing for a Transmission]

Similarly to common rolling bearings, a rolling bearing for a transmission is a component susceptible to hydrogen. In particular, as in a case of a CVT described later, under an environment in which a lubricant with low viscosity is used as transmission oil, the rolling bearing is likely to slip and susceptible to hydrogen. Further, when moisture in the air or the like is mixed in the transmission oil, hydrogen is produced due to decomposition of the mixed water, and promoted to enter the steel.

An overall structure of the rolling bearing is the same as that illustrated in FIG. 1. However, according to this rolling bearing, transmission oil filled within the transmission comes into the bearing through a space around the sealing member 6 (see FIG. 1). Until the transmission oil comes into the bearing, the grease 7 (see FIG. 1) previously enclosed in the bearing provides lubrication.

Figure 8:
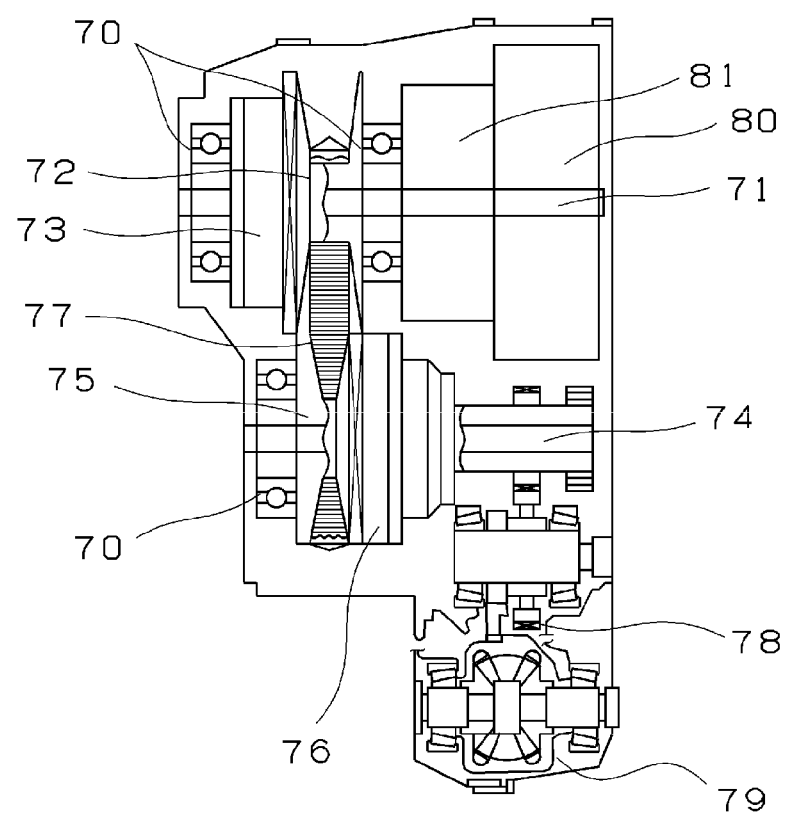
FIG. 8 is a sectional view of a transmission (CVT) using the rolling bearing as the rolling device according to the present invention.

One example of the transmission to which this type of rolling bearing is applied is shown in FIG. 8. FIG. 8 is a sectional view of the transmission (CVT). As illustrated in FIG. 8, the transmission shifts revolution of an input shaft 71 in a non-step manner and transmits it to revolution of an output shaft 74.

The input shaft 71 is driven to rotate by a drive source (not shown) such as an engine via a torque converter 80 and a planetary mechanism 81. A driving pulley 72 that rotates synchronously with the input shaft 71 is provided for the input shaft 71, and a width of a groove of the driving pulley 72 is expandably controlled by a driving actuator 73. Further, a driven pulley 75 that rotates synchronously with the output shaft 74 is provided for the output shaft 74, and a width of a groove of the driven pulley 75 is expandably controlled by a driven actuator 76. Moreover, the driven pulley 75 and the driving pulley 72 rotate at speed corresponding to respective diameters via an endless belt 77 suspended between the diameters corresponding to the selected widths of the grooves, and the power transmitted to the input shaft 71 is transmitted to the driven pulley 75 from the driving pulley 72 via the endless belt 77. The power transmitted to the driven pulley 75 is transmitted to a drive wheel (not shown) from the output shaft 74 via a reducing gear train 78 and a differential 79. As a rolling bearing 70 that rotatably supports the input shaft 71 and the output shaft 74, the rolling bearing illustrated in FIG. 1 is used.

In order to increase the speed of the output shaft 74 with respect to the input shaft 71, the width of the groove of the driving pulley 72 is made smaller, and the width of the groove of the driven pulley 75 is made greater. With this, the diameters over which the endless belt 77 is suspended becomes large for the driving pulley 72 and small for the driven pulley 75, and the speed of the output shaft 74 with respect to the input shaft 71 is increased. In order to reduce the speed of the output shaft 74 with respect to the input shaft 71, the width of the groove of the driving pulley 72 is made greater, and the width of the groove of the driven pulley 75 is made smaller. With this, the diameter of the portion over which the endless belt 77 is suspended becomes small for the driving pulley 72 and large for the driven pulley 75, whereby the speed of the output shaft 74 with respect to the input shaft 71 is reduced.

The transmission oil circulates within the transmission through an oil pump that is not shown. As described above, the transmission oil enters into the bearing through a space around the sealing member. For the CVT, a lubricant with low kinetic viscosity is used as transmission oil, for example.

Examples

Specific examples of the present invention will be described, but the present invention is not limited to these examples by any means.

<Analysis of Chemical Composition>

Table 1 shows chemical compositions of examples and Comparative Example of the steel. The steel of Comparative Example 1 is produced by continuous cast, and the steel of examples 1-3 is produced by ingot cast. The coverage in the table is a ratio (%) of oxidizing system inclusions covered by MnS in a result of inclusion inspection described later. While there is no significant difference in the chemical compositions of Comparative Example 1 (conventional steel) and examples 1-3 (developed steel), the coverage is different.

TABLE 1

| | Element composition (unit: mass percent for C to Mo and ppm for Ti and O) | | | | | | | | | | |
|---|---|---|---|---|---|---|---|---|---|---|---|
| | C | Si | Mn | P | S | Ni | Cr | Mo | Ti | O | Coverage |
| Comparative Example 1 (conventional steel) | 1.02 | 0.28 | 0.35 | 0.01 | 0.002 | 0.04 | 1.45 | 0.01 | 20 | 6 | 24% |
| Example 1 (developed steel) | 1.05 | 0.27 | 0.35 | 0.009 | 0.003 | 0.08 | 1.49 | 0.04 | 20 | 6 | 41% |
| Example 2 (developed steel) | 1.01 | 0.25 | 0.42 | 0.015 | 0.003 | 0.06 | 1.39 | 0.02 | 20 | 7 | 52% |
| Example 3 (developed steel) | 1.01 | 0.24 | 0.36 | 0.012 | 0.005 | 0.05 | 1.44 | 0.05 | 15 | 8 | 94% |

<Inclusion Inspection>

Figure 9:
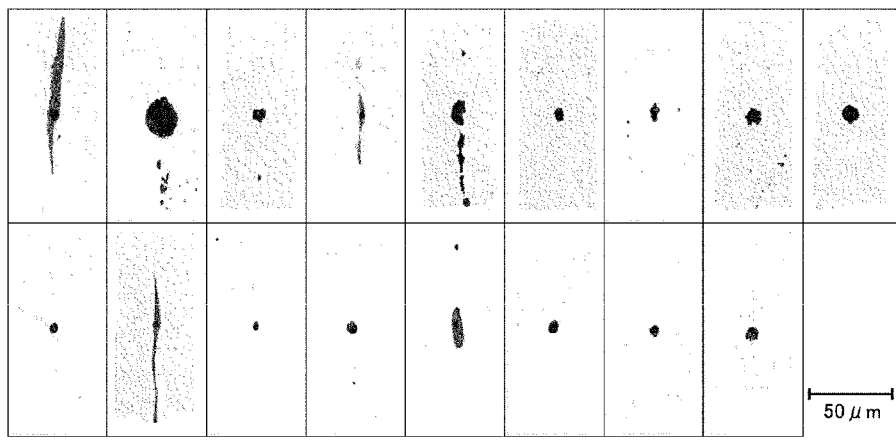
FIG. 9 is a picture showing typical examples (Comparative Example 1 and Example 1) of a result of inclusion inspection.
Figure 9:
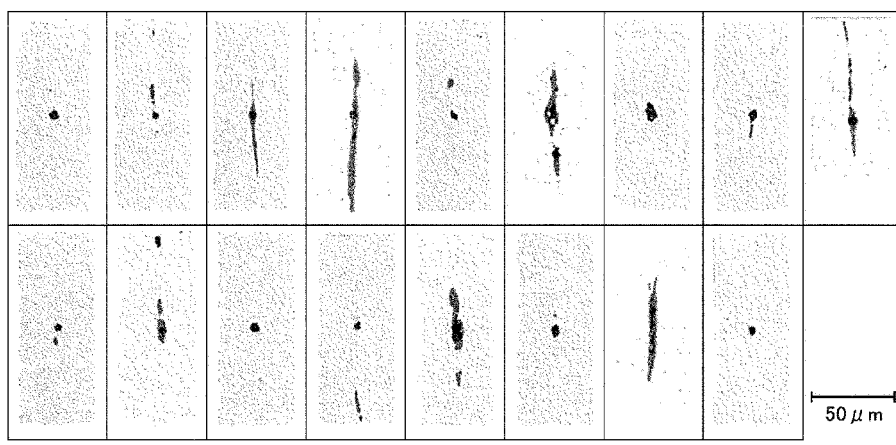
Figure 10:
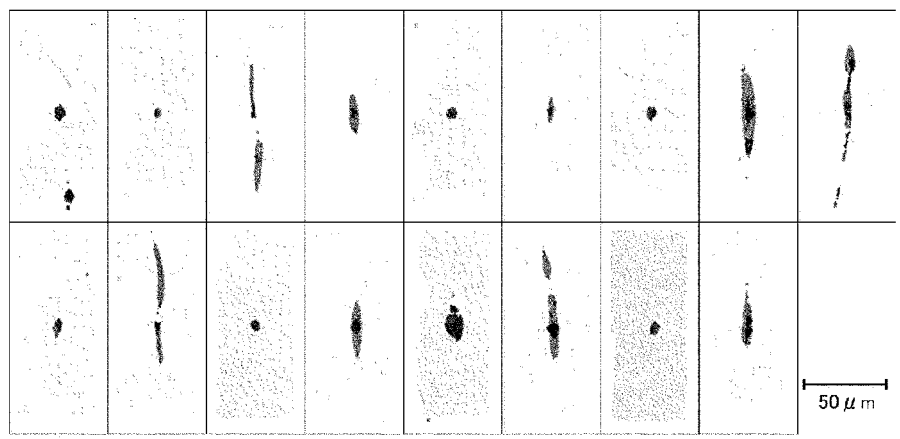
FIG. 10 is a picture showing typical examples (Example 2 and Example 3) of the result of inclusion inspection.
Figure 10:
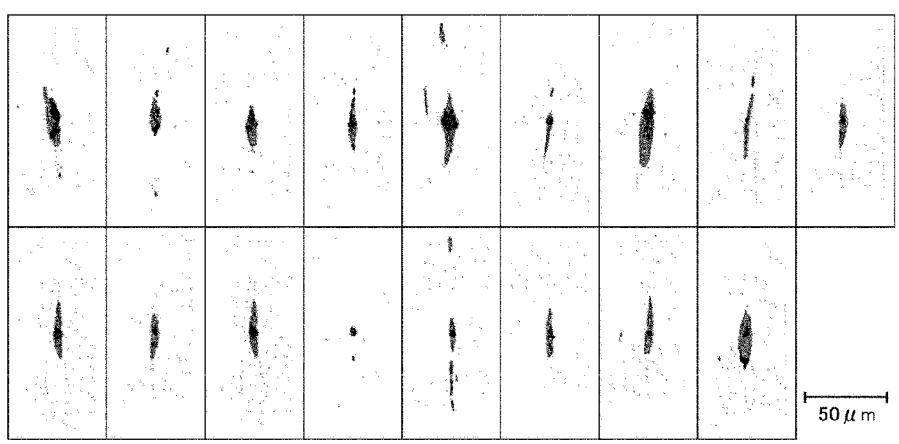

The inclusion inspection was carried out by observing and detecting oxide-based inclusions (whose maximum diameter is no smaller than 3 μm) in a sectional area of the steel of 30 mm×30 mm (testing area 900 mm$^2$), and by determining whether or not each of the detected inclusions is covered by MnS. Here, the oxide-based inclusions detected by observing the section of the steel (surface) means oxide-based inclusions exposed on this section (surface). FIG. 9 shows pictures of typical examples for Comparative Example 1 (top) and Example 1 (bottom), and FIG. 10 shows pictures of typical examples for Example 2 (top) and Example 3 (bottom). Black spots and extended black spots in the center of samples in the pictures represent oxide-based inclusions, and thin linear shape around the black spots represents MnS.

In Comparative Example 1, 988 out of 4071 were covered by MnS (coverage of 24%); in Example 1, 1620 out of 3985 were covered by MnS (coverage of 41%), in Example 2, 2137 out of 4103 were covered by MnS (coverage of 52%), and in Example 3, 4005 out of 4267 were covered by MnS (coverage of 94%).

<Ultrasonic Axial Loading Fatigue Test>

Figure 11:
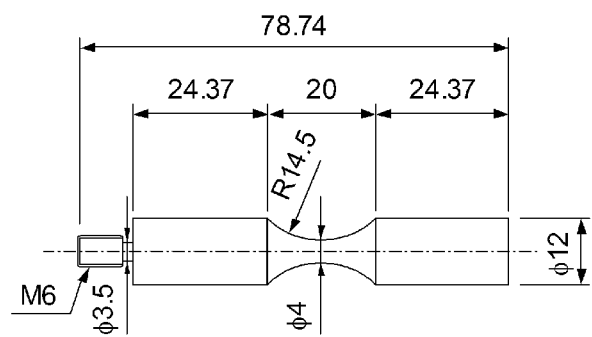
FIG. 11 is a view illustrating a shape of a test piece for ultrasonic axial loading fatigue.

An ultrasonic axial loading fatigue test is a fatigue test with which a fatigue strength of a test piece may be obtained for a short period of time by placing the test piece in a resonant condition by ultrasonic oscillation and repeatedly generating a stress. Accordingly, it is possible to cause fatigue before hydrogen having entered the steel scatters, and to evaluate an influence of hydrogen rationally. Using the steel of Comparative Example 1 and examples 1-3, ultrasonic axial loading fatigue test pieces in a shape shown in FIG. 11 were manufactured. A unit in FIG. 11 is mm. For each of the test pieces, a thermal treatment of heating for 50 minutes in an RX gas atmosphere at 850 deg C., dipping quenching in oil at 80 deg C., and tempering for 120 minutes at 180 deg C. was performed.

Figure 12:
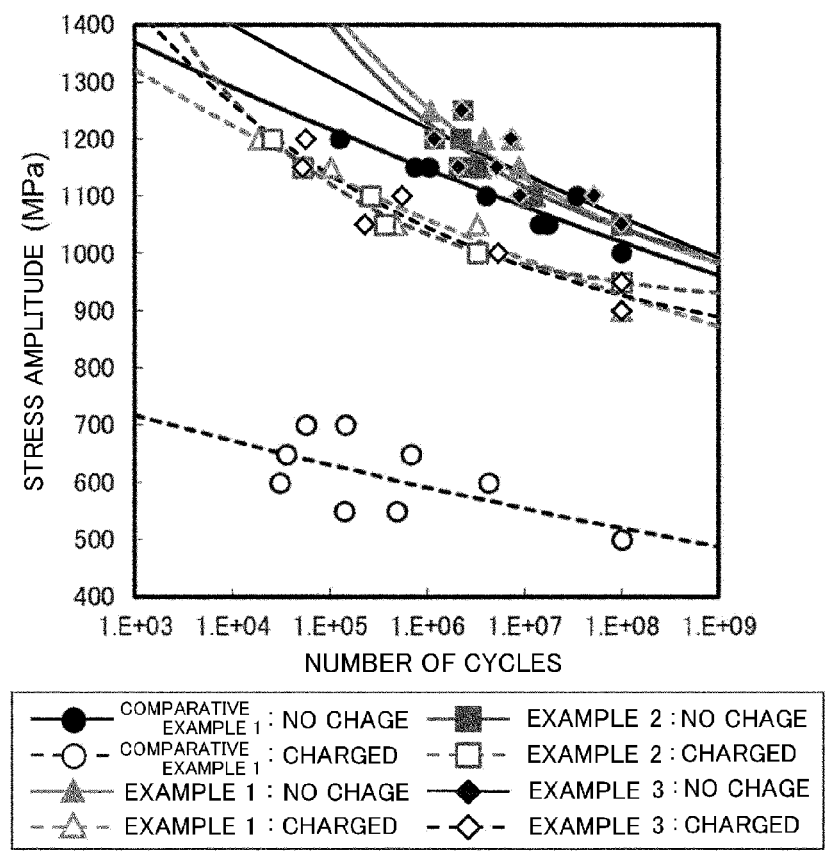
FIG. 12 is a chart showing a test result for ultrasonic axial loading fatigue.

Before performing the ultrasonic axial loading fatigue test, a cathodic electrolytic hydrogen charge was performed for 20 hours at a current density at which an amount of hydrogen in the steel is 5 mass-ppm, and then the test was performed after 10 minutes (charged). Further, a test without hydrogen charge was also performed (no charge). FIG. 12 shows a result of the ultrasonic axial loading fatigue test. In FIG. 12, a horizontal axis indicates a number of cycles, and a vertical axis indicates stress amplitude (MPa). The fatigue strength of Comparative Example 1 (conventional steel) significantly decreased by charging, but the fatigue strengths of examples 1-3 (developed steel) were only slightly lower than the cases without hydrogen charge. From this result, as compared to Comparative Example 1 (conventional steel), examples 1-3 (developed steel) are considered to have a characteristic that hydrogen is not easily accumulated around oxide-based inclusions as origins of the fracture.

<Thrust Type Life Duration Test (Rolling Fatigue Test)>

Under a rolling contact condition in which water is mixed, the water is decomposed to produce hydrogen, and the produced hydrogen enters the steel to cause premature separation. Therefore, a rolling fatigue test in water-mixed oil was performed. Inner and outer races of a thrust bearing 51106 were manufactured using the steel of Comparative Example 1 and Example 1, which were respectively called test piece 1 (Comparative Example 1) and test piece 2 (Example 1). For each of the test pieces, a thermal treatment of heating for 50 minutes in an RX gas atmosphere at 850 deg C., dipping quenching in oil at 80 deg C., and tempering for 120 minutes at 180 deg C. was performed. Further, for the steel of Example 1, a test piece in which an ammonia gas is added to an RX gas atmosphere at 850 deg C. is also manufactured. This was taken as test piece 3 (Example 1+nitriding treatment).

Figure 13:
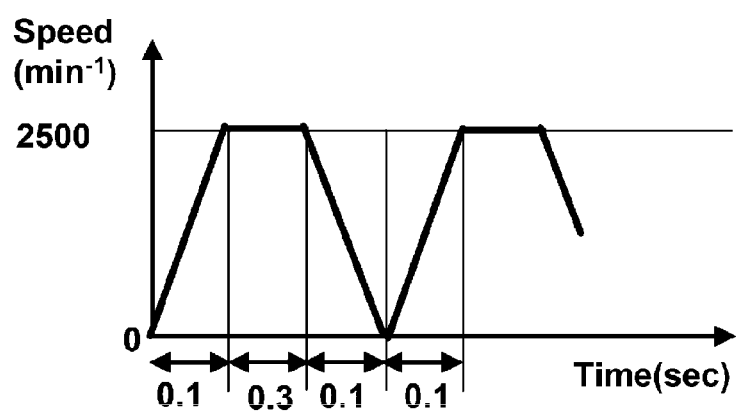
FIG. 13 is a chart showing an operation pattern of rapid acceleration/deceleration.

40±0.01 weight percent of pure water was mixed into polyglycol based synthetic oil of VG150 (density 1.073 g/cm$^3$, kinetic viscosity at 40 deg C. 150 mm$^2$/s, kinetic viscosity at 100 deg C. 23.6 mm$^2$/s). The test was performed in such a manner after the water mixed oil was produced, the water mixed oil was sealed by a thin film for wrapping food so that water may not be evaporated, and stirred for over 30 minutes using a stirrer, and then, the thrust bearing 51106 using the inner and the outer races as the test pieces is rotated in the water mixed oil of 200 mL. Here, 12 balls made of SUS440C were used. As the cage, a resin cage that holds 12 balls at regular intervals was used. Only an axial load Fa=5.10 kN was effected, and the inner race was subjected to rapid acceleration/deceleration between 0 min$^{-1}$ and 2500 min$^{-1}$. FIG. 13 shows an operation pattern. Based on calculation of elastic Hertz contact under this load condition, a maximum contact surface pressure between race surfaces and steel balls was 2.3 GPa. Here, in the calculation of elastic Hertz contact, Young's modulus and Poisson ratio of steel balls made of 51106 and SUS440C were assumed to be E=204 GPa and ν=0.29. Detection of the separation was performed by a vibration gauge.

The test was performed by preparing five test pieces for each of test piece 2 (Example 1), test piece 3 (Example 1+nitriding treatment), and test piece 1 (Comparative Example 1). All the separation occurred in race surfaces of the inner race or the outer race made of 51106, and had a characteristic to the separation due to hydrogen.

Table 2 shows $L_{10}$, $L_{50}$, and Weibull slope (shape parameter) e for each test piece obtained by applying separation life duration to 2-Parameter Weibull distribution. For test piece 1 (Comparative Example 1), $L_{10}$=38.5 hours. By contrast, for test piece 2 (Example 1), $L_{10}$=118.8 hours, exhibiting three times longer life duration than that for test piece 1 (Comparative Example 1). From this, it can be said that the rolling device according to the present invention has an effect of making premature separation due to hydrogen embrittlement difficult to occur. Further, for test piece 3 (Example 1+nitriding treatment), $L_{10}$=183.4 hours, exhibiting five times longer life duration than that for test piece 1 (Comparative Example 1). From this, it can be said that adding the nitriding treatment to test piece 2 (Example 1) has an effect of making premature separation due to hydrogen embrittlement further difficult to occur.

TABLE 2

| | Test piece 2 (Example 1) | Test piece 3 (Example 1 + nitriding treatment) | Test piece 1 (Comparative Example 1) |
|---|---|---|---|
| $L_{10}$(h) | 118.8 | 183.4 | 38.5 |
| $L_{50}$(h) | 150.4 | 235.7 | 52.1 |
| e | 7.99 | 7.52 | 6.24 |

Figure 14:
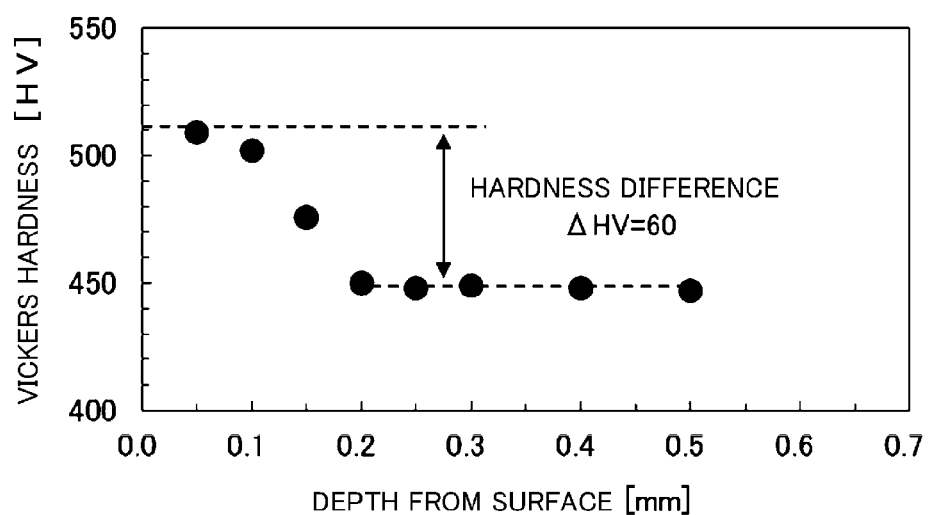
FIG. 14 is a chart showing a sectional hardness distribution in depth direction from a rolling surface.

Tempering was performed to test piece 3 (Example 1+nitriding treatment) for an hour at 500 deg C. FIG. 14 shows a sectional hardness distribution (Vickers hardness HV) in a depth direction from the rolling surface of test piece 3. Measurement was performed at intervals of 50 μm using Vickers hardness tester. As shown in FIG. 14, a hardness difference ΔHV between a site at a depth of 0.05 mm from the rolling surface and a site at a depth where nitriding was not performed (no smaller than 0.2 mm) was 60.

Figure 15:
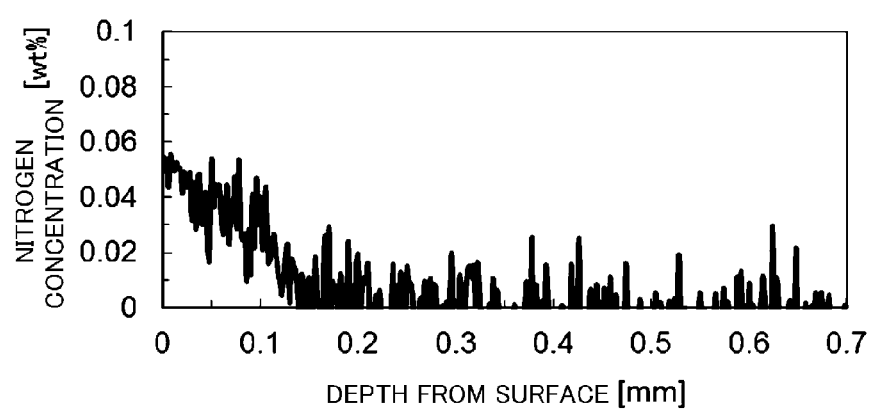
FIG. 15 is a chart showing a sectional nitrogen concentration distribution in depth direction from the rolling surface.

Further, FIG. 15 shows a sectional nitrogen concentration distribution in the depth direction from the rolling surface of the same test piece. Measurement was performed using Electron Probe Micro Analyzer (EPMA), under conditions of acceleration voltage 15 kV, spot diameter 2 μm, measurement interval 2 μm, and measurement time 1 sec (second). The nitrogen concentration distribution in the steel was measured using EPMA to an inward direction from the rolling surface of the test piece. As shown in FIG. 15, the surface concentration of nitrogen was 0.05 weight percent. As used herein, the "surface" in the surface concentration of nitrogen refers to a depth range of 0 mm to 0.01 mm from the surface. As the nitrogen concentration in the superficial layer becomes higher, ΔHV increases.

INDUSTRIAL APPLICABILITY

The rolling device according to the present invention is able to effectively prevent premature separation due to hydrogen embrittlement, and therefore may be suitably used as a rolling bearing used in automotive electric components and auxiliary components such as an alternator, an electromagnetic clutch for an car air-conditioner, a fan coupling device, an intermediate pulley, and electric fan motors; a rolling bearing used in step-up gears or reduction gears for a wind generator or the like; a rolling bearing used for transmissions such as a continuously variable transmission, a hub bearing for rotatably supporting a wheel of an automobile, a gear, and a component of the above.

EXPLANATION OF REFERENCE SYMBOLS AND NUMERALS

1: rolling bearing
2: inner race
3: outer race
4: rolling body
5: cage
6: sealing member
7: grease
8a, 8b: opening
9: cooling fan
10: casing
11: oil chamber
12: agitation chamber
13: divider
14: port
15: spring
16: bimetal
17: piston
18: driving disk
19: circulation hole
20: driving shaft
21a, 21b: frame
22: rotor
23: rotor shaft
24: rotor coil
25: stator
26: stator coil
27: pulley
28: pulley main body
31: hub ring
32: inner race
33: outer member
34: rolling body
35: inner member
36: hub bearing
37: sealing member
38: sealing member
41: step-up gear body
42: input shaft
43: output shaft
44: housing
45: lubricant
46: planetary gear mechanism
47: secondary step-up gear
48: carrier
49: planetary gear
50: ring gear
51: sun gear
52: intermediate output shaft
53-56: gear
57: rolling bearing
58: inner race
59: outer race
60: rolling body
70: rolling bearing
71: input shaft
72: driving pulley
73: driving actuator
74: output shaft
75: driven pulley
76: driven actuator
77: endless belt
78: reducing gear train
79: differential
80: torque converter
81: planetary mechanism

The invention claimed is:

1. A rolling device having a roller element made of steel, wherein at least a part of oxide-based inclusions included in the steel of the roller element is covered by MnS, and a ratio of a number of oxide-based inclusions covered by MnS is over 40% of a total number of oxide-based inclusions having maximum diameter of 3 μm or greater in the steel constituting the roller element,
    wherein the steel is an ignot casting, and
    wherein an element composition of the steel is such that C is no smaller than 0.95 mass percent and no greater than 1.1 mass percent, Si is smaller than 0.35 mass percent, Mn is smaller than 0.5 mass percent, S is smaller than 0.025 mass percent, Cr is no smaller than 1.4 mass percent and smaller than 1.6 mass percent, and remaining elements are iron and impurities.

2. The rolling device according to claim 1, wherein the roller element is configured by performing a nitriding treatment to a superficial layer of the roller element, and a surface concentration of nitrogen is from 0.05 weight percent to 0.6 weight percent.

3. The rolling device according to claim 2, wherein a Vickers hardness difference ΔHV between a site at a depth of 0.05 mm from a surface of the roller element and a site at a depth where no nitrogen is included is no smaller than 60.

4. The rolling device according to claim 1, wherein the rolling device is a rolling bearing having an inner race, an outer race, and rolling bodies, and at least one selected from the inner race, the outer race, and the rolling bodies is the roller element.

5. The rolling device according to claim 4, wherein the rolling bearing is a rolling bearing configured for use in an automobile electric component or an auxiliary component, the rolling bearing rotatably supporting a rotating shaft to a static member, the rotating shaft being driven to rotate by an output from an engine.

6. The rolling device according to claim 5, wherein the rolling bearing is a rolling bearing configured for use in automobile alternator, an automobile fan coupling device, or an automobile idler pulley.

7. The rolling device according to claim 4, wherein the rolling bearing is a rolling bearing configured for use in a step-up/reduction gear that steps up or reduces revolution of an input shaft using a planetary gear and transmits the revolution to the output shaft, the rolling bearing rotatably supporting the planetary gear while lubricated with oil.

8. The rolling device according to claim 7, wherein the step-up/reduction gear is a step-up gear configured for use in a wind generator.

9. The rolling device according to claim 4, wherein the rolling bearing is a rolling bearing configured for use in a transmission that is disposed within a transmission that shifts and transmits revolutions of an input shaft and revolution of an output shaft, the rolling bearing rotatably supporting one of the input shaft, the output shaft, and a member that rotates along with the revolution.

10. The rolling device according to claim 9, wherein the transmission is of a variable speed type that shifts for transmitting the revolution of the input shaft and the revolution of the output shaft in a non-step manner.

11. The rolling device according to claim 1, wherein the rolling device is a hub bearing that is provided with a component having a rolling contact portion and that is configured to rotatably support a wheel of an automobile, and the component is the roller element.

* * * * *